United States Patent
Ke

(10) Patent No.: US 12,469,132 B2
(45) Date of Patent: Nov. 11, 2025

(54) METHOD AND ELECTRONIC DEVICE FOR EVALUATING OSTEOPOROSIS

(71) Applicant: Acer Incorporated, New Taipei (TW)

(72) Inventor: Liang-Yu Ke, New Taipei (TW)

(73) Assignee: Acer Incorporated, New Taipei (TW)

( * ) Notice: Subject to any disclaimer, the term of this patent is extended or adjusted under 35 U.S.C. 154(b) by 331 days.

(21) Appl. No.: 18/313,356

(22) Filed: May 7, 2023

(65) Prior Publication Data
US 2024/0331141 A1    Oct. 3, 2024

(30) Foreign Application Priority Data
Mar. 30, 2023    (TW) ................................. 112112281

(51) Int. Cl.
*G06T 7/00* (2017.01)
*G06T 5/00* (2024.01)
*G06V 10/42* (2022.01)

(52) U.S. Cl.
CPC .............. *G06T 7/0012* (2013.01); *G06T 5/00* (2013.01); *G06V 10/42* (2022.01); *G06T 2207/10081* (2013.01); *G06T 2207/10116* (2013.01); *G06T 2207/20081* (2013.01); *G06T 2207/20084* (2013.01); *G06T 2207/30008* (2013.01)

(58) Field of Classification Search
None
See application file for complete search history.

(56) References Cited

U.S. PATENT DOCUMENTS

| | | | |
|---|---|---|---|
| 2019/0303677 A1* | 10/2019 | Choutas | G06N 3/09 |
| 2022/0386942 A1* | 12/2022 | Diaz-Arias | A61B 5/45 |
| 2024/0130703 A1* | 4/2024 | Kim | G16H 30/40 |

FOREIGN PATENT DOCUMENTS

TW    I719843    2/2021

OTHER PUBLICATIONS

Fakai Wang et al., "Opportunistic Screening of Osteoporosis Using Plain Film Chest X-ray", Part of the Lecture Notes in Computer Science book series, vol. 12928, Apr. 5, 2021, pp. 1-9.
Ophir Gozes et al., "Bone Structures Extraction and Enhancement in Chest Radiographs via CNN Trained on Synthetic Data", 2020 IEEE 17th International Symposium on Biomedical Imaging (ISBI), Mar. 20, 2020, pp. 1-4.
Wayne Forrest, "Bone density tests have a friend in deep learning", retrieved on May 4, 2023, Available at: https://www.auntminnie.com/index.aspx?sec=ser&sub=def&pag=dis&ItemID=127232.
Erik L. Ridley, "Deep learning can find osteoporosis on chest x-rays", retrieved on May 4, 2023, Available at: https://www.auntminnie.com/index.aspx?sec=ser&sub=def&pag=dis&ItemID=127009.
Jae-Seo Lee et al., "Osteoporosis detection in panoramic radiographs using a deep convolutional neural network-based computer-assisted diagnosis system: a preliminary study", Dentomaxillofacial Radiology, vol. 48, No. 1, Jan. 2019, pp. 1-8.

* cited by examiner

*Primary Examiner* — Nancy Bitar
(74) *Attorney, Agent, or Firm* — JCIPRNET

(57) ABSTRACT

A method and an electronic device are used to estimate osteoporosis. The method includes the following steps. An X-ray image is obtained. The X-ray image is input into a first convolutional neural network model to generate a bone probability heatmap of the X-ray image. A bone density estimation value is estimated based on the bone probability heatmap, the X-ray image, and a second convolutional neural network model.

12 Claims, 4 Drawing Sheets

METHOD AND ELECTRONIC DEVICE FOR EVALUATING OSTEOPOROSIS

CROSS-REFERENCE TO RELATED APPLICATION

This application claims the priority benefit of Taiwan application serial no. 112112281, filed on Mar. 30, 2023. The entirety of the above-mentioned patent application is hereby incorporated by reference herein and made a part of this specification.

BACKGROUND

Technical Field

The disclosure relates to a medical image evaluation technology, and in particular, to a method and electronic device for estimating osteoporosis.

Description of Related Art

With the advancement of science and technology, the application of artificial intelligence (AI) technology in the medical field has received considerable attention. It has been an important topic to apply the AI technology to improve the medical quality and reduce the burden on doctors. Taiwan has entered an aging society, and the number of people with osteoporosis is also increasing. Osteoporosis does not have obvious symptoms, but osteoporosis will make the bones weak and increase the risk of fractures. That is to say, patients may suffer from fractures caused by minor trauma, which further cause many symptoms and dysfunctions and even cause death. Therefore, the prevention and screening of osteoporosis is an important medical and public health issue.

Chest X-rays are currently a very common medical examination and an easily accessible examination for the general public. The chest X-rays may directly capture the sternum and spine, which is beneficial for bone density detection. However, in order to ensure a more accurate judgment of osteoporosis, there are still many issues to be explored on how to judge osteoporosis based on the chest X-ray images.

SUMMARY

The disclosure provides a method and an electronic device for estimating osteoporosis, which may improve an accuracy of estimating a bone density status based on an X-ray image.

An embodiment of the disclosure provides a method of estimating osteoporosis, adapted for an electronic device, including the following steps. An X-ray image is obtained. The X-ray image is input to a first convolutional neural network model to generate a bone probability heatmap of the X-ray image. A bone density estimation value is estimated based on the bone probability heatmap, the X-ray image, and a second convolutional neural network model.

An embodiment of the disclosure provides an electronic device for estimating osteoporosis, including a storage device and a processor. The processor is coupled to the storage device and is configured to: obtain an X-ray image; input the X-ray image to a first convolutional neural network model to generate a bone probability heatmap of the X-ray image; and estimate a bone density estimation value based on the bone probability heatmap, the X-ray image, and a second convolutional neural network model.

Based on the above, the method and electronic device for estimating osteoporosis of the embodiments of the disclosure may estimate the bone density estimation value based on the information provided by the entire X-ray image and the bone probability heatmap, thereby greatly improving the anti-interference and the stability and improving the overall accuracy of the bone density estimation.

DESCRIPTION OF THE EMBODIMENTS

Figure 1:
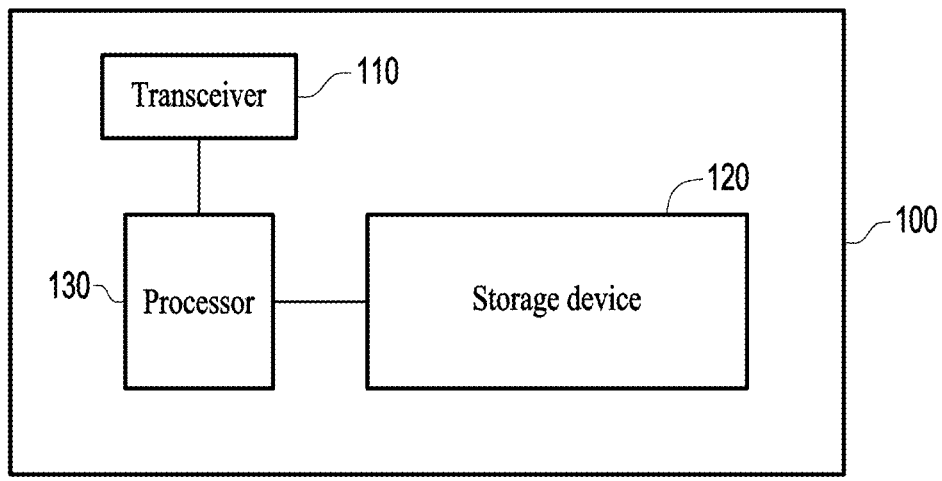
FIG. 1 is a schematic diagram of an electronic device according to an embodiment of the disclosure.

Parts of the embodiments of the disclosure will be described in details below with reference to the accompanying drawings. For the reference numerals used in the following description, the same reference numerals appearing in different drawings will be regarded as the same or similar components. These embodiments are only a part of the disclosure, and do not disclose all possible implementation modes of the disclosure. Rather, these embodiments are only examples of the devices and methods within the scope of the disclosure.

Please refer to FIG. 1. FIG. 1 is a schematic diagram of an electronic device according to an embodiment of the disclosure. An electronic device 100 is a computer device with computing capability. In different embodiments, the electronic device 100 is, for example, various computer devices and/or server devices, but is not limited thereto. As shown in FIG. 1, the electronic device 100 includes a transceiver 110, a storage device 120, and a processor 130.

The transceiver 110 transmits and receives signals in a wireless or wired manner. The transceiver 110 may also perform operations such as low noise amplification, impedance matching, frequency mixing, up or down frequency conversion, filtering, amplification, and the like.

The storage device 120 is, for example, any type of fixed or removable random access memory (RAM), read-only memory (ROM), flash memory, hard disk drive (HDD), solid state drive (SSD) or similar components, or a combination of the above components, and is used to store multiple modules, various program codes, or various instructions that may be executed by the processor 130.

The processor 130 is coupled to the transceiver 110 and the storage device 120, and may be a general-purpose processor, a special-purpose processor, a conventional processor, a digital signal processor, multiple microprocessors, one or more microprocessors combined with a digital signal processor core, a controller, a microcontroller, an application specific integrated circuit (ASIC), a field programmable gate array (FPGA), any other types of integrated circuits, state machines, advanced RISC Machine (ARM), or similar components.

In the embodiment of the disclosure, the processor 130 may access the modules and program codes recorded in the storage device 120 to implement the method of estimating osteoporosis proposed by the disclosure, and the details thereof are described below.

Figure 2:
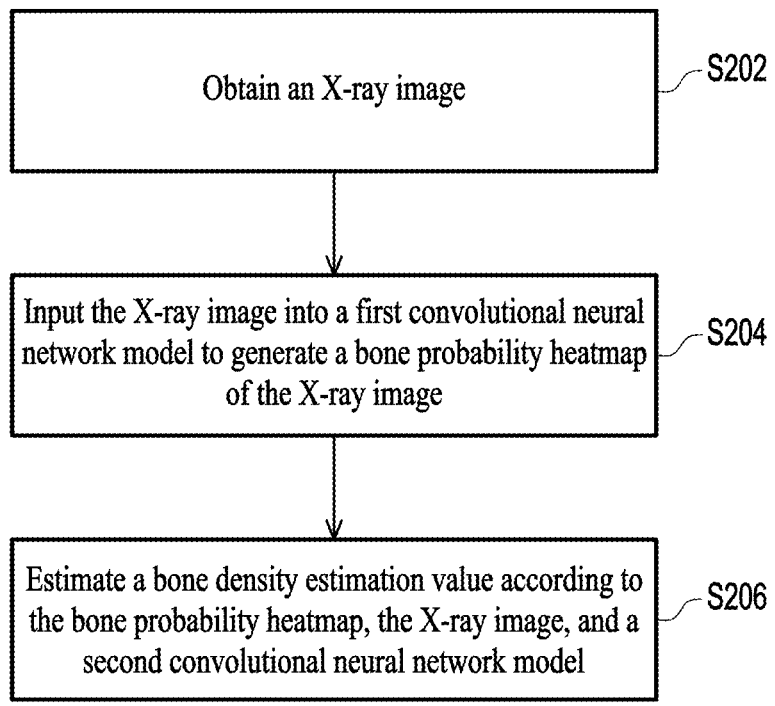
FIG. 2 is a flowchart of a method of estimating osteoporosis according to an embodiment of the disclosure.
Figure 3:
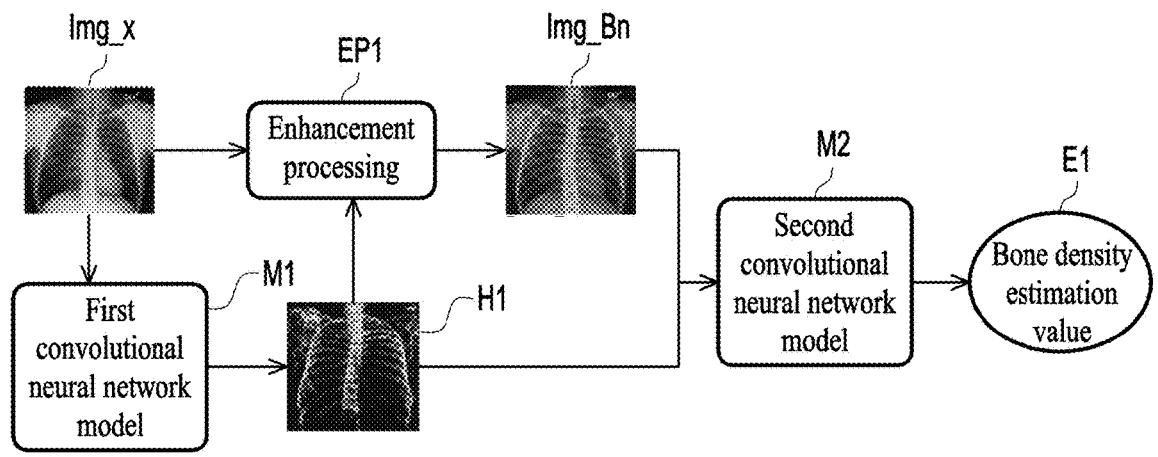
FIG. 3 is a schematic diagram of estimating a bone density estimation value using a first convolutional neural network model and a second convolutional neural network model according to an embodiment of the disclosure.

Please refer to FIG. 2 and FIG. 3. FIG. 2 is a flowchart of a method of estimating osteoporosis according to an embodiment of the disclosure, and FIG. 3 is a schematic diagram of estimating a bone density estimation value using a first convolutional neural network model and a second convolutional neural network model according to an embodiment of the disclosure. The method of the embodiment may be executed by the electronic device 100 of FIG. 1. The details of each step in FIG. 2 will be described in details below with reference to the components shown in FIG. 1 and the schematic content in FIG. 3.

First, in step S202, the processor 130 may obtain an X-ray image Img_x. In some embodiments, the processor 130 may obtain the X-ray image Img_x through the transceiver 110. The X-ray image Img_x is generated by a device capable of emitting X-rays, such as an X-ray machine. The X-ray image Img_x is composed of multiple pixels arranged in an array. Based on the different absorption capabilities of human tissues to X-rays, the original pixel value of each pixel on the X-ray image Img_x depends on the X-ray dose of the X-ray penetrating the human body. It should also be noted that when X-rays penetrate human tissues, the human tissues penetrated by the X-rays may include skin, fat, muscle, organs or/and bones. Therefore, the pixel value of each pixel on the X-ray image Img_x depends on the composition of one or more human tissues penetrated by the X-ray.

In some embodiments, the X-ray image Img_x may be a chest X-ray image. Alternatively, in some other embodiments, the X-ray image Img_x may be an X-ray image of other parts of the body.

Next, in step S204, the processor 130 may input the X-ray image Img_x into a first convolutional neural network model M1 to generate a bone probability heatmap H1 of the X-ray image Img_x. In detail, the first convolutional neural network model M1 is a trained deep learning model. The model parameters of the trained first convolutional neural network model M1 may be recorded in the storage device 120. The first convolutional neural network model M1 may include multiple convolution layers and multiple pooling layers. The convolution layer may use one or more convolution kernels to perform convolution operations. The pooling layer is used for pooling operations. In some embodiments, the first convolutional neural network model M1 may use a U-Net architecture as a backbone network. The U-Net architecture may include a downsampling network part and an upsampling network part. Alternatively, in some other embodiments, the first convolutional neural network model M1 may use an M-Net architecture, a U-Net++ architecture, or other optimized convolutional neural network architectures as the backbone network.

In more detail, the processor 130 may input the X-ray image Img_x into the first convolutional neural network model M1, so that the first convolutional neural network model M1 outputs the corresponding bone probability heatmap H1. The bone probability heatmap H1 includes multiple bone weight values, and the bone weight values may be probability values respectively. The multiple bone weight values on the bone probability heatmap H1 correspond one-to-one to the pixels on the X-ray image Img_x. In some embodiments, if the X-ray image Img_x has m*n pixels, the bone probability heatmap H1 output by the first convolutional neural network model M1 may include m*n bone weight values. In other embodiments, if the X-ray image Img_x has m*n pixels, the bone probability heatmap output by the first convolutional neural network model M1 may include u*v bone weight values. The processor 130 may further include the bone probability heatmap with u*v bone weight values for scaling processing, so as to obtain the bone probability heatmap H1 including m*n bone weight values. It may be seen that the pixel value of each pixel on the X-ray image Img_x depends on the composition state of the various human tissues penetrated by the X-ray. Correspondingly, a certain bone weight value of the bone probability heatmap H1 may represent the probability value of a bone component corresponding to a certain pixel on the X-ray image Img_x. In other words, the higher the bone weight value on the bone probability heatmap H1, the greater the bone component corresponding to the corresponding pixel on the X-ray image Img_x.

In addition, it should be noted that, in order to enable the first convolutional neural network model M1 to have the above-mentioned capabilities, multiple CT images may be used to generate ground truth information for training the first convolutional neural network model M1. The part will be described in detail later.

Finally, in step S206, the processor 130 may estimate a bone density estimation value E1 according to the bone probability heatmap H1, the X-ray image Img_x, and a second convolutional neural network model M2. In different embodiments, the bone density estimation value E1 may include bone mineral density (BMD), T-score, or Z-score.

Specifically, the second convolutional neural network model M2 is a trained deep learning model. The model parameters of the trained second convolutional neural network model M2 may be recorded in the storage device 120. The second convolutional neural network model M2 may include a feature extraction network and a fully connected network. The feature extraction network is a convolutional neural network for extracting feature information, which may include multiple convolution layers and multiple pooling layers. The fully connected network is used to perform a regression operation to generate the bone density estimation value E1. That is to say, the output information of the second convolutional neural network model M2 is the bone density estimation value E1.

It should be noted that in different embodiments, the input information of the second convolutional neural network model M2 may be implemented in different states. However, in some embodiments, the input information of the second convolutional neural network model M2 must include the bone probability heatmap H1. By providing the bone probability heatmap H1 to the second convolutional neural network model M2, the second convolutional neural network model M2 may obtain the probability of the bone component of each pixel on the X-ray image Img_x. Therefore, the second convolutional neural network model M2 may determine which pixels on the X-ray image Img_x to refer to based on the bone probability heatmap H1, so as to more accurately estimate the bone density estimation value E1. In other words, the second convolutional neural network model M2 may refer to the bone weight value on the bone probability heatmap H1 to achieve the effect of focusing on the bone.

As shown in FIG. 3, in some embodiments, the input information of the second convolutional neural network model M2 may include a bone enhancement image Img_Bn and the bone probability heatmap H1. Here, the processor 130 may generate the bone enhancement image Img_Bn according to the X-ray image Img_x and the bone probability heatmap H1. In other words, the processor 130 may perform an enhancement processing EP1 on the X-ray image Img_x according to the bone probability heatmap H1 to generate the bone enhancement image Img_Bn. The bone enhancement image Img_Bn may be regarded as the enhanced X-ray image where the enhancement processing EP1 has been performed.

In detail, the processor 130 may adjust the original pixel value of each pixel on the X-ray image Img_x according to the bone weight value on the bone probability heatmap H1, so as to generate an enhanced pixel value of each pixel on Img_Bn. In some embodiments, the enhancement processing EP1 includes the following operations. The processor 130 may calculate a normalized pixel value of each pixel on the X-ray image Img_x according to a preset ratio parameter. Next, the processor 130 may calculate the enhanced pixel value of each pixel on the bone enhancement image Img_Bn according to the preset ratio parameter and the normalized pixel value, the original pixel value, and the bone weight value corresponding to each pixel on the X-ray image Img_x. The bone probability heatmap H1 includes the bone weight value corresponding to each pixel on the X-ray image Img_x.

For example, the processor 130 may calculate the normalized pixel value of each pixel on the X-ray image Img_x according to the following formula (1) and calculate the enhanced pixel value of each pixel on the bone enhancement image Img_Bn according to the following formula (2):

$$A_{x,y}^{normalized} = \frac{\left(A_{x,y}^{input} - A_{mean}\right)}{A_{SD}} + (1 - \alpha) \quad \text{formula (1)}$$

$$A_{x,y}^{Bone\_Enhanced} = A_{x,y}^{input} \times \alpha + A_{x,y}^{Probability\_Heatmap} \times A_{x,y}^{normalized} \quad \text{formula (2)}$$

wherein, $A_{x,y}^{normalized}$ is the normalized pixel value of the pixel Px, y on the X-ray image Img_x; $A_{x,y}^{input}$ is the original pixel value of the pixel Px, y on the X-ray image $A_{mean}$, is the average of the original pixel values of all pixels on the X-ray image Img_x; $A_{SD}$ is the standard deviation of the original pixel values of all pixels on the X-ray image Img_x; $A_{x,y}^{Probability.Heatmap}$ is the bone weight value corresponding to the pixel Px, y of the X-ray image Img_x on the bone probability heatmap H1; $A_{x,y}^{Bone.Enhanced}$ is the enhanced pixel value of the pixel Pex,y on the bone enhancement image Img_Bn; and α is the preset ratio parameter. Here, x and y represent the pixel positions.

Based on formula (1) and formula (2), when the preset ratio parameter α is increased, the enhancement magnitude of the X-ray image Img_x enhanced according to the bone probability heatmap H1 may be increased. When the preset ratio parameter α is decreased, the enhancement magnitude of the X-ray image Img_x enhanced according to the bone probability heatmap H1 may be reduced.

Alternatively, for example, the processor 130 may calculate the enhanced pixel value of each pixel on the bone enhancement image Img_Bn according to the following formula (3):

$$A_{x,y}^{Bone\_Enhanced} = A_{x,y}^{input} \times \alpha + A_{x,y}^{Probability\_Heatmap} \times A_{x,y}^{input} \times (1 - \alpha) \quad \text{formula (3)}$$

wherein, $A_{x,y}^{input}$ is the original pixel value of the pixel Px, y on the X-ray image Img_x; $A_{x,y}^{Probability.Heatmap}$ is the bone weight value corresponding to the pixel Px, y of the X-ray image Img_x on the bone probability heatmap H1; $A_{x,y}^{Bone.Enhanced}$ is the enhanced pixel value of the pixel Pex,y on the bone enhancement image Img_Bn; and α is the preset ratio parameter. Here, x and y represent the pixel positions.

Based on the formula (3), when the preset ratio parameter α is increased, the proportion of the X-ray image Img_x may be increased and the proportion of the bone probability heatmap H1 may be decreased. When the preset ratio parameter α is decreased, the proportion of the X-ray image Img_x may be reduced and the proportion of the bone probability heatmap H1 may be increased.

By using the bone probability heatmap H1 to perform the enhancement processing EP1 on the X-ray image Img_x, the enhanced pixel value corresponding to the high bone weight value in the bone enhancement image Img_Bn is generated by a relatively higher enhancement magnitude, and the enhanced pixel value corresponding to the low bone weight value in the bone enhancement image Img_Bn is generated by a relatively lower enhancement magnitude. In other words, the pixels corresponding to the high bone components in the X-ray image Img_x may be effectively enhanced. As shown in FIG. 3, the bone enhancement image Img_Bn may present the human bones more clearly.

Afterwards, the processor 130 may input the bone enhancement image Img_Bn and the bone probability heatmap H1 into the second convolutional neural network model M2 to estimate the bone density estimation value E1. The second convolutional neural network model M2 may be a single-input single-output model. In some embodiments, the second convolutional neural network model M2 may include a feature extraction network and a fully connected network. The feature extraction network is connected to the fully connected network. In some embodiments, the fully connected network may include a global average pooling (GAP) layer. In some embodiments, the fully connected network may be implemented by the global average pooling (GAP) layer.

Figure 4:
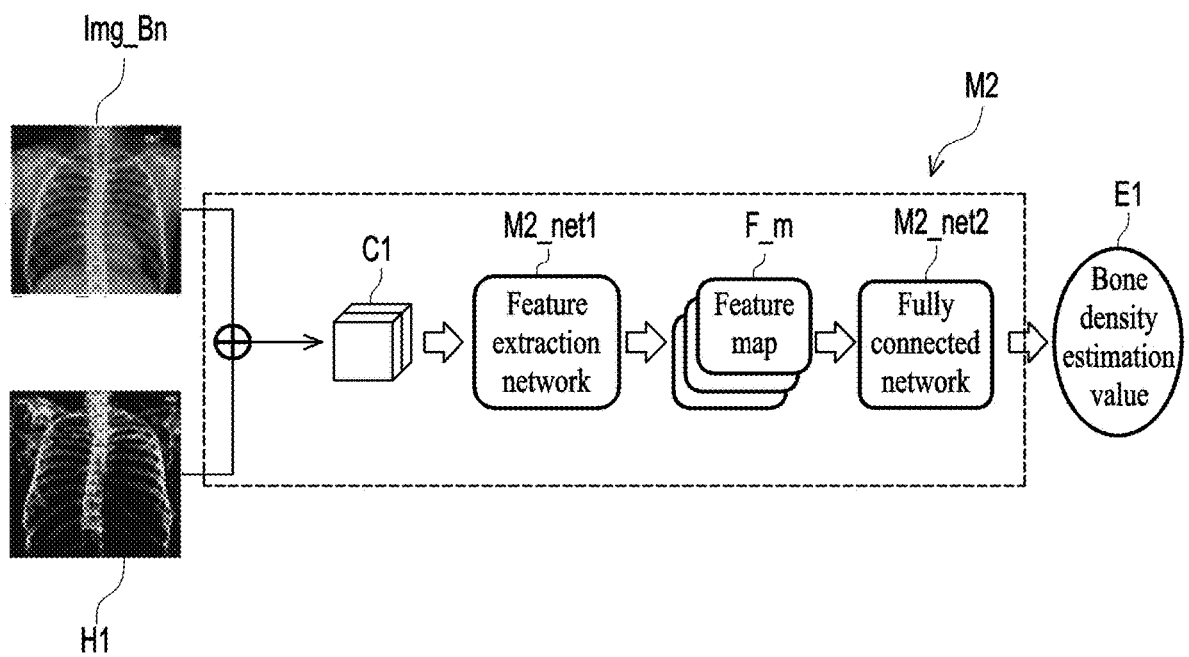
FIG. 4 is a schematic diagram of a second convolutional neural network model according to an embodiment of the disclosure.

In detail, FIG. 4 is a schematic diagram of a second convolutional neural network model according to an embodiment of the disclosure. Please refer to FIG. 4. In the embodiment, the processor 130 may concatenate the bone enhancement image Img_Bn and the bone probability heatmap H1 to generate a concatenation result C1. The concatenation result C1 is generated by combining the bone enhancement image Img_Bn with the bone probability heatmap H1. Concatenation processing is the merging of the channel numbers. Here, the channel number of the bone enhancement image Img_Bn and the channel number of the bone probability heatmap H1 are 1. Through the concatenation processing, the channel number of the concatenation result C1 is 2. However, in other embodiments, the processor 130 may fuse the bone enhancement image Img_Bn and the bone probability heatmap H1 in a fusion manner.

In the embodiment shown in FIG. 4, the processor 130 may input the concatenation result C1 of the bone enhancement image Img_Bn and the bone probability heatmap H1 into the second convolutional neural network model M2 to estimate the bone density estimation value E1. In the embodiment of FIG. 4, the second convolutional neural network model M2 includes a feature extraction network M2_net1 and a fully connected network M2_net2. The fully connected network M2_net2 may include or be replaced by a global average pooling layer. The number and the configuration of the convolution layers and the pooling layers in the feature extraction network M2_net1 may be set according to actual needs. In some embodiments, the feature extraction network M2_net1 is, for example, a densely connected convolution network (DenseNet), but is not limited thereto. The feature extraction network M2_net1 may perform feature extraction (including convolution processing and pooling processing, etc.) according to the concatenation result C1 to generate multiple feature maps F_m. The number of feature maps output by each convolution layer in the feature extraction network M2_net1 depends on the number of the convolution kernels used by each convolution layer.

Next, the processor 130 may feed the multiple feature maps F_m into the fully connected network M2_net2. The fully connected network M2_net2 may perform a regression operation based on the multiple feature maps F_m to output the bone density estimation value E1. In some embodiments, the feature maps F_m may be processed by a global average pooling layer before the regression operation is performed to obtain the bone density estimation value E1.

It may be seen that the second convolutional neural network model M2 may know which pixels in the bone enhancement image Img_Bn have a higher reference value and which pixels in the bone enhancement image Img_Bn have a less reference value according to the bone probability heatmap H1. Therefore, the accuracy of the bone density estimation value E1 estimated by the second convolutional neural network model M2 may be effectively improved. Moreover, the bone probability heatmap H1 may achieve the human bone perception at the pixel level, which may greatly improve the anti-interference and the stability.

In addition, it should be noted that during the training process of the second convolutional neural network model M2, the true bone density in the training data may be obtained through a bone density measuring instrument. Moreover, the X-ray image training collection in the training data may be obtained by the shooting of an X-ray machine. Alternatively, the X-ray image training collection in the training data may be simulated and generated by multiple computed tomography (CT) images. In addition, after completing the training of the first convolutional neural network model M1, the processor 130 may generate multiple bone probability heatmaps for model training according to the X-ray image training collection and the trained first convolutional neural network model M1. During the training process of the second convolutional neural network model M2, the processor 130 may calculate the loss value according to the true bone density, the bone density estimation value output by the second convolutional neural network model M2, and a loss function. The processor 130 may adjust the model weight of the second convolutional neural network model M2 according to the loss value generated by the loss function and determine whether the learning of the second convolutional neural network model M2 is completed.

In addition, FIG. 3 takes the input information of the second convolutional neural network model M2 including the bone enhancement image Img_Bn and the bone probability heatmap H1 as an example of implementation. However, in some other embodiments, the input information of the second convolutional neural network model M2 may include the X-ray image Img_x and the bone probability heatmap H1. Alternatively, in still some embodiments, the input information of the second convolutional neural network model M2 may include the X-ray image Img_x, the bone enhancement image Img_Bn, and the bone probability heatmap H1.

Figure 5:
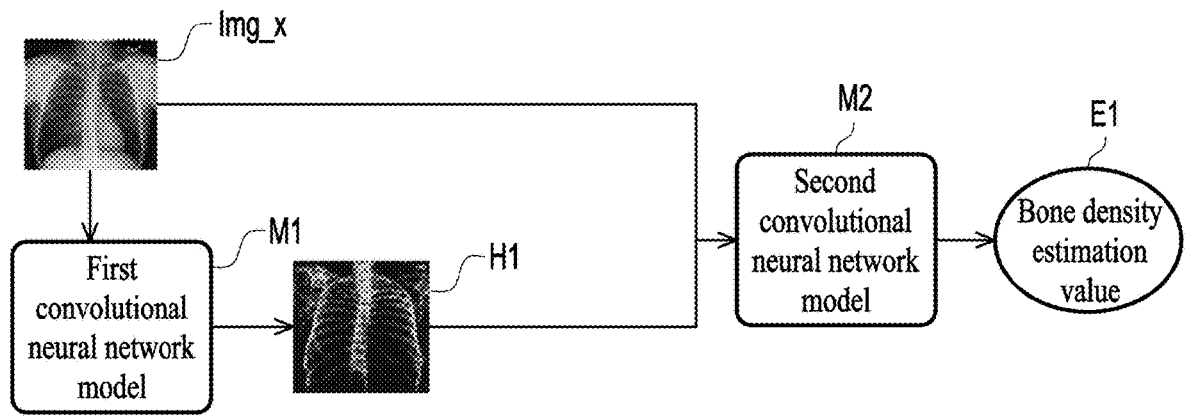
FIG. 5 is a schematic diagram of estimating a bone density estimation value using a first convolutional neural network model and a second convolutional neural network model according to an embodiment of the disclosure.

Please refer to FIG. 5. FIG. 5 is a schematic diagram of estimating a bone density estimation value using a first convolutional neural network model and a second convolutional neural network model according to an embodiment of the disclosure. After the processor 130 uses the first convolutional neural network model M1 to generate the bone probability heatmap H1 of the X-ray image Img_x, the processor 130 may input the X-ray image Img_x and the bone probability heatmap H1 into the second convolutional neural network model M2 to estimate the bone density estimation value E1. Here, the processor 130 may, for example, concatenate the X-ray image Img_x and the bone probability heatmap H1 according to the mechanism shown in FIG. 4, and then feed the concatenation result with a channel number of 2 into the feature extraction network M2_net1 in the second convolutional neural network model M2.

Figure 6:
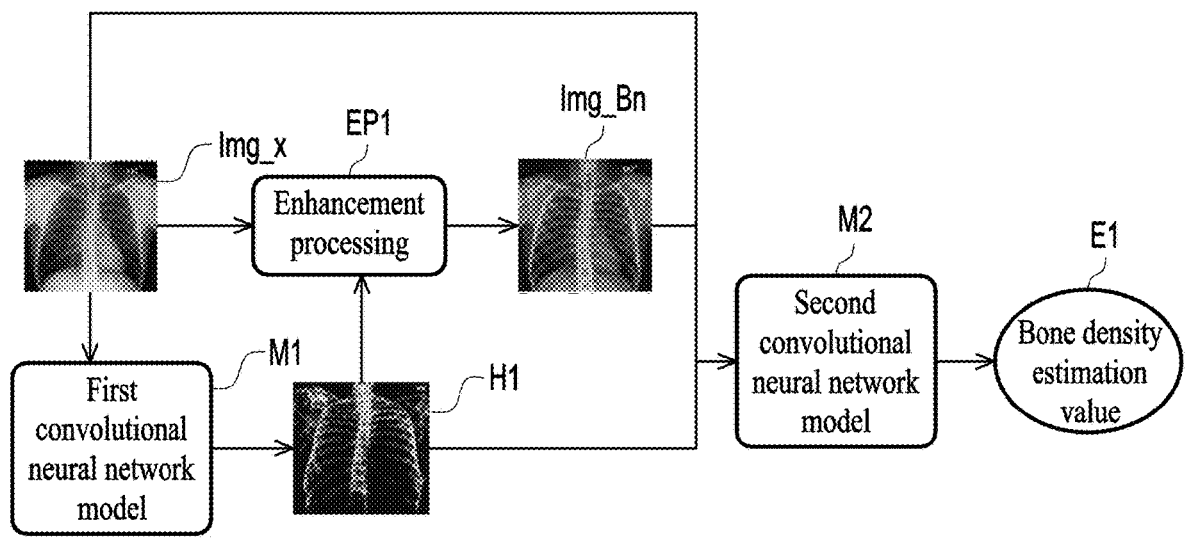
FIG. 6 is a schematic diagram of estimating a bone density estimation value using a first convolutional neural network model and a second convolutional neural network model according to an embodiment of the disclosure.

Please refer to FIG. 6. FIG. 6 is a schematic diagram of estimating a bone density estimation value using a first convolutional neural network model and a second convolutional neural network model according to an embodiment of the disclosure. The processor 130 uses the first convolutional neural network model M1 to generate the bone probability heatmap H1 of the X-ray image Img_x and performs an enhancement processing EP1 on the X-ray image Img_x according to the bone probability heatmap H1 to generate a bone enhancement image Img_Bn. The details thereof have been explained above and so are not be repeated here. Afterwards, the processor 130 may input the X-ray image Img_x, the bone enhancement image Img_Bn, and the bone probability heatmap H1 into the second convolutional neural network model to estimate the bone density estimation value E1. Here, the processor 130 may concatenate the X-ray image Img_x, the bone enhancement image Img_Bn, and the bone probability heatmap H1 according to the mechanism shown in FIG. 4 to generate the concatenation result with a channel number of 3. Afterwards, the processor 130 may feed the concatenation result with the channel number of 3 into the feature extraction network M2_net1 in the second convolutional neural network model M2.

Figure 7:
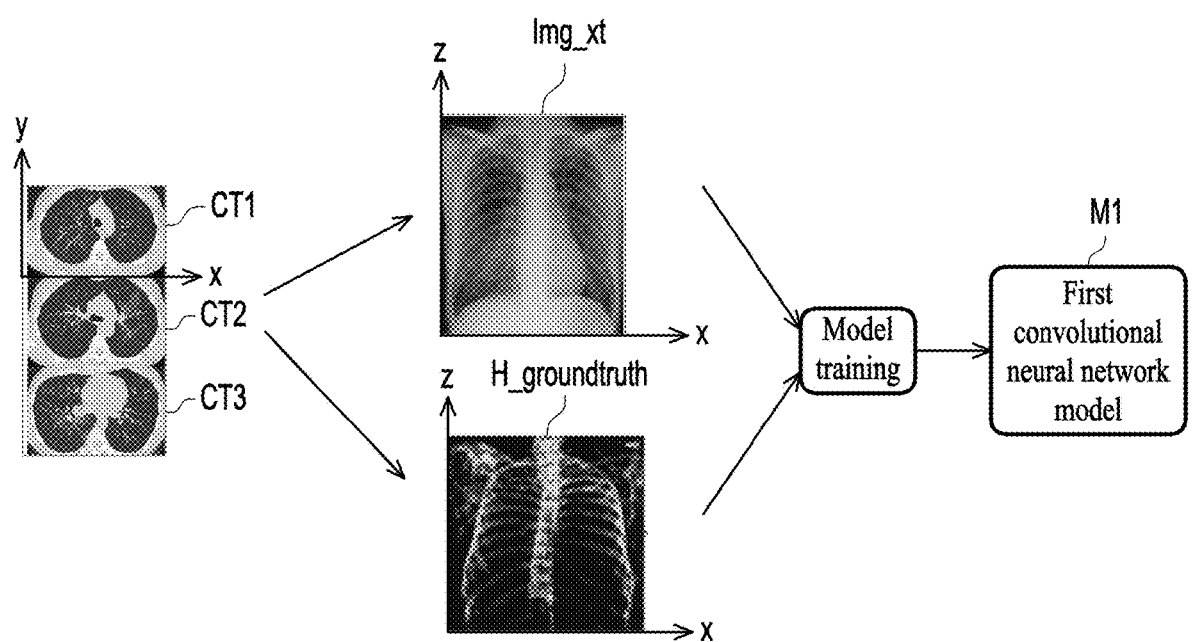
FIG. 7 is a schematic diagram of generating a ground truth image for training a first convolutional neural network model according to an embodiment of the disclosure.

Regarding the training of the first convolutional neural network model M1, please refer to FIG. 7. FIG. 7 is a schematic diagram of generating a ground truth image for training a first convolutional neural network model according to an embodiment of the disclosure. In some embodiments, the processor 130 may use multiple CT images (such as CT images CT1, CT2, and CT3 shown in FIG. 7) to train the first convolutional neural network model M1. A ground truth image H_groundtruth used to train the first convolutional neural network model M1 is generated based on such CT images.

In detail, the CT images are actually cross-sectional scan images of the human body. Here, the CT image is represented as an XY plane image. Correspondingly, the X-ray image is actually a projected image of the human body, so the X-ray image may be expressed as an XZ plane image. According to a CT value of each pixel on the CT image, the processor 130 may directly classify the pixel on the CT image as a bone type or a non-bone type. More specifically, the pixel with the CT value (also known as Hounsfield unit (HU) value, a HU value) between 300 and 700 may be classified as the bone type. Conversely, the pixel whose CT value are not between 300 and 700 may be classified as the non-bone type. In the example of FIG. 7, according to the CT value of each pixel on the CT image CT1 (i.e., the first CT image), the processor 130 may classify each pixel on the CT image CT1 (i.e., the first CT image) as the bone type or the non-bone type.

Under the condition that the pixels of all CT images may be classified as the bone types or the non-bone types, the processor 130 may simulate and generate a training X-ray image Img_xt for training the first convolutional neural network model M1 according to the multiple CT images (i.e., CT images CT1, CT2, and CT3) along a Z axis. The processor 130 may, for example, simulate and generate the training X-ray image Img_xt based on the technique described in the document "Bone Structures Extraction and Enhancement in Chest Radiographs via CNN Trained on Synthetic Data". Therefore, the relevant details may be referred to the above-mentioned document and are not be repeated here. Alternatively, in some other embodiments, the X-ray image training collection used for training the first convolutional neural network model M1 may be actually generated by the shooting of an X-ray machine.

In addition, in some embodiments, the processor 130 may sum up the CT values of the pixels whose X-axis coordinate components (i.e., the first coordinate component) are n on the CT image CT1 (i.e., the first CT image) and classified as the bone types to obtain a first summed value, wherein n is an integer. The processor 130 may sum up the CT values of all pixels whose X-axis coordinate components (i.e., the first coordinate component) are n on the CT image CT1 (i.e., the first CT image) to obtain a second summed value. In other words, the CT values of the pixels with the same X-axis coordinates and with the classifications of the bone types may be summed up to generate the first summed value. In addition, the CT values of the pixels with the same X-axis coordinates may also be summed to generate a second summed value. Afterwards, by dividing the first summed value by the second summed value, the processor 130 may obtain a bone probability heat ground truth value on the ground truth image H_groundtruth. Therefore, according to the information of the multiple CT images along the Z axis, the processor 130 may obtain all the bone probability heat ground truth values on the ground truth image H_groundtruth. It may be seen that, based on a CT image, the processor 130 may generate multiple bone probability heat ground truth values running horizontally along one of the X-axis directions on the ground truth image H_groundtruth.

For example, the processor 130 may generate the bone probability heat ground truth value of the ground truth image H_groundtruth according to the following formulas (3) to (5):

$$\text{Total\_HU}_{x,z}^{Bone} = \sum_y HU \text{ in } [300, 700] \quad \text{formula (3)}$$

$$\text{Total\_HU}_{x,z}^{NonBone} = \sum_y HU \text{ not in } [300, 700] \quad \text{formula (4)}$$

$$\text{Probability\_heatmap}_{x,z}^{Ground\,Truth} = \frac{\text{Total\_HU}_{x,z}^{Bone}}{\text{Total\_HU}_{x,z}^{Bone} + \text{Total\_HU}_{x,z}^{NonBone}} \quad \text{formula (5)}$$

wherein, HU represents the CT value of the CT image; $\text{Total\_HU}_{x,z}^{Bone}$ is the total value of the CT values located on a straight line along a Y-axis direction on the CT image and corresponding to the bone types (i.e, the first summed value); $\text{Total\_HU}_{x,z}^{NonBone}$ is the total value of the CT values located on a straight line along a Y-axis direction on the CT image and corresponding to the non-bone types; x and z represent the positions of the bone probability heat ground truth values; y represents a Y-axis position of the CT value. In addition, $\text{Total\_HU}_{x,z}^{Bone}+\text{Total\_HU}_{x,z}^{NonBone}$ represents the total value (i.e., the second summed value) of all CT values located on a straight line along a Y-axis direction on the CT image. $\text{Probablity\_heatmap}_{x,z}^{GroundTruth}$ is the bone probability heat ground truth value on the ground truth image H_groundtruth.

In this way, through the formulas (3) to (5), the processor 130 may obtain all the bone probability heat ground truth values on the ground truth image H_groundtruth according to the multiple CT images. Therefore, the processor 130 may train the first convolutional neural network model M1 according to the ground truth image H_groundtruth and the training X-ray image Img_xt. More specifically, the processor 130 may input the training X-ray image Img_xt into the first convolutional neural network model M1 to generate a estimation result, and the processor 130 may calculate the difference between the estimation result and the ground truth image H_groundtruth according to the loss function so as to update the model parameters of the first convolutional neural network model M1. When the loss value generated by the loss function meets the condition, the processor 130 may determine that the training of the first convolutional neural network model M1 is completed. Therefore, the trained first convolutional neural network model M1 may be used to assist in estimating the bone density estimation value E1 of the human body.

However, in other embodiments, a dual-energy X-ray absorptiometry (DXA) machine may directly output the bone X-ray images and the chest X-ray images. Therefore, the bone X-ray images generated by the DXA may be directly used as the ground truth images, and the chest X-ray images generated by the DXA may be used as the training X-ray images to train the first convolutional neural network model M1 for estimating the bone probability heatmap.

In the embodiment of the disclosure, the processor 130 may provide the bone density estimation value E1 to relevant medical personnel as a reference for diagnosis, but is not limited thereto.

To sum up, the method of estimating osteoporosis proposed by the disclosure may first use the convolutional neural network model to generate the bone probability heatmap of the X-ray image. Afterwards, another convolutional neural network model may estimate the bone density estimation value of the subject based on the bone probability heatmap and the X-ray images. It may be seen that, in the embodiment of the disclosure, the bones on the entire X-ray image may be used, and there is no need to capture a specific part of the range and discard a part of the bones on the X-ray image. In addition, the embodiment of the disclosure may simultaneously input the clear bone enhancement image and the bone probability heatmap into the convolutional neural network model, so that the convolutional neural network model may refer to the bone probability heatmap to achieve a more focused estimation effect on the bones. Therefore, the anti-interference and the stability may be greatly improved, thereby improving the overall accuracy of the bone density estimation.

What is claimed is:

1. A method of estimating an osteoporosis, adapted for an electronic device, comprising:
   obtaining an X-ray image;

inputting the X-ray image into a first convolutional neural network model to generate a bone probability heatmap of the X-ray image; and estimating a bone density estimation value according to the bone probability heatmap, the X-ray image, and a second convolutional neural network model, wherein the step of estimating the bone density estimation value according to the bone probability heatmap, the X-ray image, and the second convolutional neural network model comprises:

generating a bone enhancement image according to the X-ray image and the bone probability heatmap; and inputting the bone enhancement image and the bone probability heatmap into the second convolutional neural network model to estimate the bone density estimation value, wherein the step of inputting the bone enhancement image and the bone probability heatmap into the second convolutional neural network model to estimate the bone density estimation value comprises:

concatenating the bone enhancement image with the bone probability heatmap.

2. The method of estimating the osteoporosis according to claim 1, wherein the X-ray image is a chest X-ray image.

3. The method of estimating the osteoporosis according to claim 1, wherein the step of estimating the bone density estimation value according to the bone probability heatmap, the X-ray image, and the second convolutional neural network model comprises:

inputting the X-ray image and the bone probability heatmap into the second convolutional neural network model to estimate the bone density estimation value.

4. The method of estimating the osteoporosis according to claim 1, wherein the step of generating the bone enhancement image according to the X-ray image and the bone probability heatmap comprises:

calculating a normalized pixel value of each pixel on the X-ray image according to a preset ratio parameter; and calculating an enhanced pixel value of each pixel on the bone enhancement image according to the preset ratio parameter, the normalized pixel value corresponding to each pixel on the X-ray image, an original pixel value, and a bone weight value, wherein the bone probability heatmap comprises the bone weight value corresponding to each pixel on the X-ray image.

5. The method of estimating the osteoporosis according to claim 1, wherein the step of inputting the bone enhancement image and the bone probability heatmap into the second convolutional neural network model to estimate the bone density estimation value comprises:

inputting the X-ray image, the bone enhancement image, and the bone probability heatmap into the second convolutional neural network model to estimate the bone density estimation value.

6. The method of estimating the osteoporosis according to claim 1, wherein the step of inputting the bone enhancement image and the bone probability heatmap into the second convolutional neural network model to estimate the bone density estimation value further comprises:

inputting a concatenation result of the bone enhancement image and the bone probability heatmap into the second convolutional neural network model to estimate the bone density estimation value, wherein a channel number of the bone enhancement image and a channel number of the bone probability heatmap are 1, and the channel number of the concatenation result is 2.

7. The method of estimating the osteoporosis according to claim 1, wherein the second convolutional neural network model comprises a feature extraction network, the second convolutional neural network model comprises a fully connected network, and the feature extraction network is connected to the fully connected network.

8. The method of estimating the osteoporosis according to claim 7, wherein the fully connected network comprises a global average pooling (GAP) layer.

9. The method of estimating the osteoporosis according to claim 1, wherein the bone density estimation value comprises a bone mineral density (BMD), a T-score, or a Z-score.

10. The method of estimating the osteoporosis according to claim 1, further comprising:

training the first convolutional neural network model by using a plurality of CT images, wherein a ground truth image for training the first convolutional neural network model is generated according to the CT images.

11. The method of estimating the osteoporosis according to claim 10, wherein the CT images comprise a first CT image, and the step of training the first convolutional neural network model by using the CT images comprises:

classifying each pixel on the first CT image as a bone type or a non-bone type;

summing up a CT value of each pixel whose first coordinate component is n on the first CT image and classified as the bone type to obtain a first summed value, and summing up the CT values of all of the pixels whose first coordinate component is n on the first CT image to obtain a second summed value; and obtaining a bone probability heat ground truth value on the ground truth image by dividing the first summed value by the second summed value.

12. An electronic device for estimating an osteoporosis, comprising:

a storage device, for recording a plurality of modules; and a processor, coupled to the storage device, and configured to access the module to:

obtain an X-ray image;

input the X-ray image into a first convolutional neural network model to generate a bone probability heatmap of the X-ray image; and estimate a bone density estimation value according to the bone probability heatmap, the X-ray image, and a second convolutional neural network model, wherein the processor is further configured to:

generate a bone enhancement image according to the X-ray image and the bone probability heatmap; and input the bone enhancement image and the bone probability heatmap into the second convolutional neural network model to estimate the bone density estimation value, wherein the processor is further configured to:

concatenating the bone enhancement image with the bone probability heatmap.

* * * * *